United States Patent [19]

Burgess

[11] Patent Number: 5,055,691
[45] Date of Patent: Oct. 8, 1991

[54] RADIATION METER

[76] Inventor: Peter H. Burgess, 73 Charlton Road, Wantage Oxfordshire, OX12 8HJ, Great Britain

[21] Appl. No.: 531,042

[22] Filed: May 31, 1990

[30] Foreign Application Priority Data

Jun. 3, 1989 [GB] United Kingdom ............... 8912812.8

[51] Int. Cl.$^5$ .............................................. G01T 1/02
[52] U.S. Cl. ......................... 250/370.07; 250/370.14; 250/370.06; 250/370.01
[58] Field of Search ...................... 250/370.01, 370.14, 250/336.1, 336.2, 371, 308, 370.06, 370.07

[56] References Cited

U.S. PATENT DOCUMENTS

| 4,025,788 | 5/1977 | Arima et al. | 250/253 |
| 4,182,954 | 1/1980 | Giles | 250/308 |
| 4,300,050 | 11/1981 | Hizo et al. | 250/374 |
| 4,659,930 | 4/1987 | Johnson et al. | 250/336.1 |
| 4,871,914 | 10/1989 | Simon et al. | 250/370.02 |
| 4,876,454 | 10/1989 | Burgess | 250/370.14 |

OTHER PUBLICATIONS

Gotlib et al., "Thermolunminescence Dosimetry of Beta Radiation", Nuclear Technology Publishing vol. 22, No. 1 pp. 13–17 (1988).

Burgkhardt, et al., "Analysis of Beta-Radiation Fields in the Fuel Cycle", 9th Int. Conference on Solid State Dosimetry, Vienna (1989).

Primary Examiner—Constantine Hannaher
Assistant Examiner—Edward J. Glick
Attorney, Agent, or Firm—McCubbrey, Bartles, Meyer & Ward

[57] ABSTRACT

Measuring means comprising first and second silicon PIN diode detectors (1, 2) both being covered with a thin layer of conducting material (3, 5) and the second detector being additionally covered with a relatively thick layer of material (4), the thickness being chosen such that beta radiation dose rate can be measured in beta radiation fields of high or medium energy, and in the presence of X and gamma radiation.

15 Claims, 2 Drawing Sheets

RADIATION METER

FIELD OF THE INVENTION

This invention relates to the measurement of beta dose rate, and more particularly to the measurement of beta dose rate using silicon PIN diode detectors.

It is known to use silicon PIN diodes as radiation detectors for X and/or gamma radiation, but such detectors are not at present used for the measurement of beta radiation in the presence of X and/or gamma radiation of comparable dose rate. The existing procedure and apparatus used for X or gamma dosimetry are not suitable for beta radiation dosimetry.

SUMMARY OF THE INVENTION

The main object of the invention is to provide an improved radiation meter which is capable of measuring a beta radiation dose rate in the presence of extremely short wavelength electromagnetic radiation such as X and/or gamma radiation.

The present invention in a preferred form is a radiation meter comprising first and second radiation detectors, a shield for each detector, the shield for the first detector being constituted by a thin layer of conducting material, and the shield for the second detector being constituted by either a thin layer of conducting material and a relatively thick layer of dielectric material or a thick layer of low atomic number conducting material. The thin conducting layer over one detector shields that detector from electromagnetic interference while minimally shielding it from beta radiation, while the thick layer over the second detector also has at least one conducting component which shields it from electromagnetic interference, but, in addition, the greater total thickness significantly attenuates radiation. The thick layer should be composed of low atomic number materials. The responses of the two detectors will be found to be virtually identical for X and gamma radiation above, typically, approximately 50 keV but will differ significantly for beta radiation. In this way beta radiation dose rate can be measured in the presence of X and gamma radiation.

Other objects and features of the invention will become apparent from the description which follows by way of example.

DETAILED DESCRIPTION

The particular embodiment described hereinafter is concerned with measuring beta dose rate over an energy range of 0.5 MeV Emax to 2.27 MeV Emax.

Figure 1:
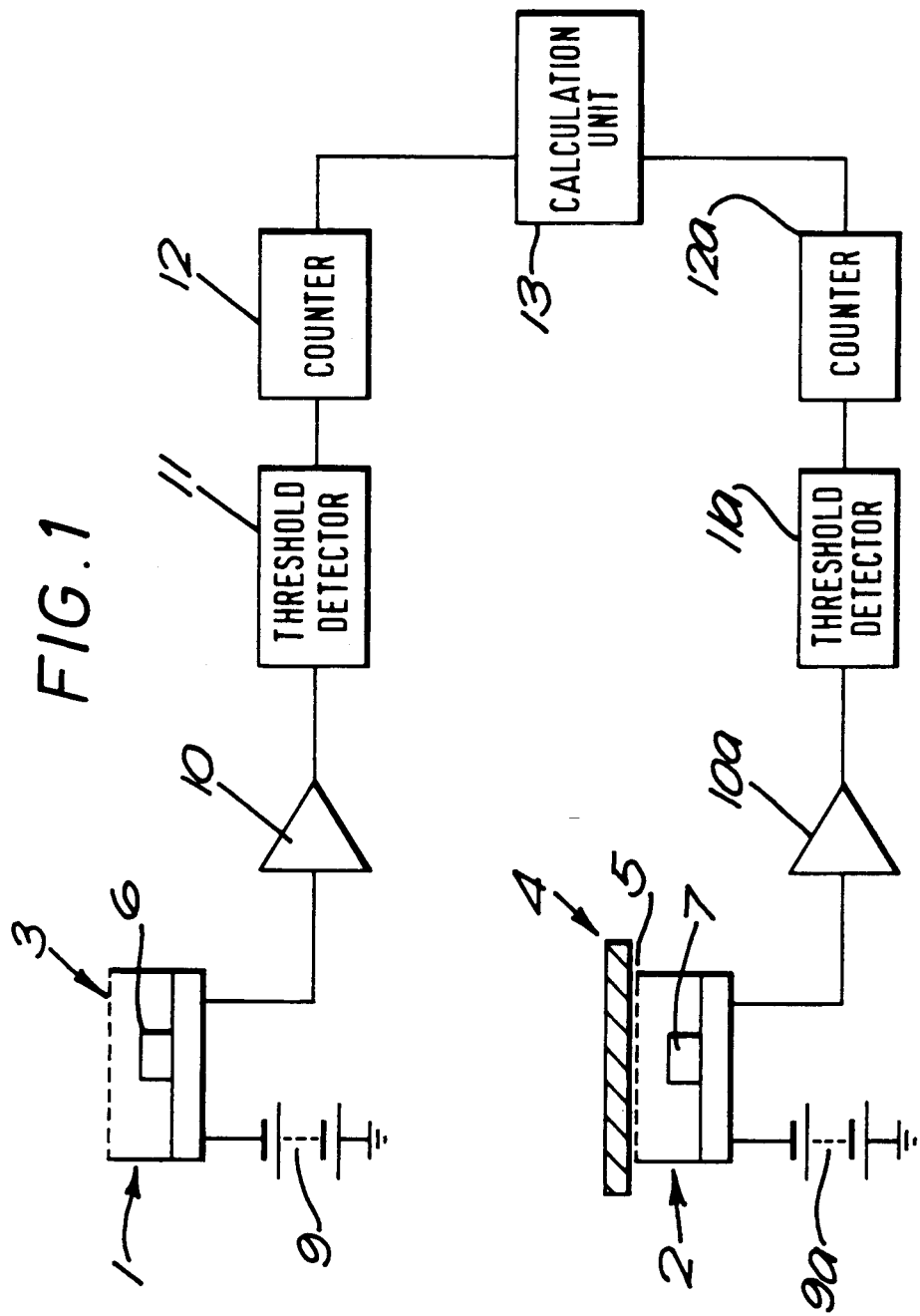
FIG. 1 shows schematically the arrangement of two detectors in a circuit suitable for implementing this invention.

As shown in FIG. 1, two silicon PIN diodes 6 and 7, operated in the reverse biased, non-conducting mode may be used as the detecting elements in detectors 1 and 2 respectively. The detector 1 is connected to an amplifier 10. The output of the amplifier is fed to a threshold detector 11 which provides an output pulse when the output of the amplifier exceeds a threshold. The amplifier and threshold detector may be adjusted for the purpose of calibration. Output pulses from threshold detector 11 pass in turn to a counter 12 which is connected to one input of a calculation unit 13. A battery 9 provides the reverse bias for the diode or the like in the detector 1 and the circuit is completed by a supply rail (not shown).

The detector 2 is connected to an amplifier 10a. The output of amplifier 10a is fed to a threshold detector 11a which operates in a similar may to threshold detector 11 described above. Output pulses from the threshold detector 11a pass in turn to a counter 12a which is connected to a second input of the calculation unit 13. A battery 9a provides the reverse bias for the diode or the like in the detector 2.

When mounted for operation in an instrument neither detector 1 or 2 should be covered by a significant thickness of high atomic number materials in the casing or elsewhere; nor should the sensitive layer in either of the detectors be covered by glass.

One of the detectors 1 has the sensitive layer covered only by a thin layer of electrically conductive material 3, which is adequate to provide electrical screening and which may be for example, a copper-coated synthetic plastic. The conducting material shields the detector from electromagnetic interference. The layer should be sufficiently thin so as not to significantly attenuate radiation. A typical thickness may of the order of 0.02 mm.

The other detector 2 is similarly covered with a thin layer of electrically conductive material 5 (similar to the layer and is additionally covered with a substantially thicker layer of low atomic number material 4, which acts (as described later) as an absorber and may, for example, plastic of the order of 2 mm thick or magnesium of the order of 1 mm thick. Magnesium is one example of a metal which has an atomic number less than 20.

The thick layer 4 should not be a complete attenuator of beta radiation, but should allow some transmission at high energies of beta radiation.

If a high energy source of beta radiation is considered, and the response of a totally uncovered detector is defined as F, where F is the count rate per unit dose rate, then the response of the detector 1 covered by the thin conducting layer 3 will be kF, where k is the transmission of the layer, and k will be close to unity: for example, $0.9 < k < 1$. The response of detector 2 will be mF, where m is the transmission of the combined cover of the thin conducting layer 5 plus the thicker layer 4, and m may be approximately 0.5. The difference in response between the two detectors in a high energy beta dose rate field will thus be:

$$kF - mF = (k-m)F, \text{ which may be of the order of } 0.5 \text{ F}.$$

If a medium energy source of beta radiation is considered, the response of a totally uncovered detector may be defined as S, which will be less than F. The response of detector 1 covered by this conducting layer 3 will be nS, where n is the transmission of the layer and is of the order of 0.5, determined by the attenuation of the covering material, which is itself determined by the degree of immunity to electric and magnetic fields which is required. Comparing the two cases, n is not equal to k because the electron energy is different in each case and hence the transmission is different. The response of detector 2 covered by the conducting layer 5 and the layer 4 will be close to zero. In this case the difference in count rate between the two detectors will be:

$$nS-0=nS$$

The thickness of the layer 4 is selected to compensate for the attenuation of the necessary thin conducting cover at medium energies of beta radiation, and to provide a difference in response between the two detectors at high energies of beta radiation which is approximately equal to the difference in response between the two detectors at medium energies of beta radiation. In other words, the difference in count rate obtained should be the same irrespective of actual electron energy. That being so the following result should hold:

$$(k-m)FrnS$$

The value of m can be calculated, for example, by measuring the values of k and F for $^{90}Sr/^{90}Y$ beta radiation (Emax=2.27 MeV), and the values of n and S for $^{204}Tl$ beta radiation. This can then be converted into a value for the thickness of the layer 4.

It will be found that the response of the two detectors will be substantially identical for X and gamma radiation under conditions of secondary electron equilibrium, and therefore it is possible to measure beta radiation dose rate for medium and high energy beta emitters even though the radiation detectors might be in X and gamma radiation fields, the significant factor being the difference between the two count rates as a result of the attenuation of the beta radiation.

Accordingly, the calculation unit shown in FIG. 1, which may be a microprocessor for example, subtracts the value in the counter for detector 2 from the value in the counter for detector 1, and divides the results by the appropriate factor, either (k−m) or n, to generate a value of beta dose, which is approximately independent of energy for high and medium energy beta radiation. The values of (k−m) and of n are known for the particular arrangement of detectors used.

Figure 2:
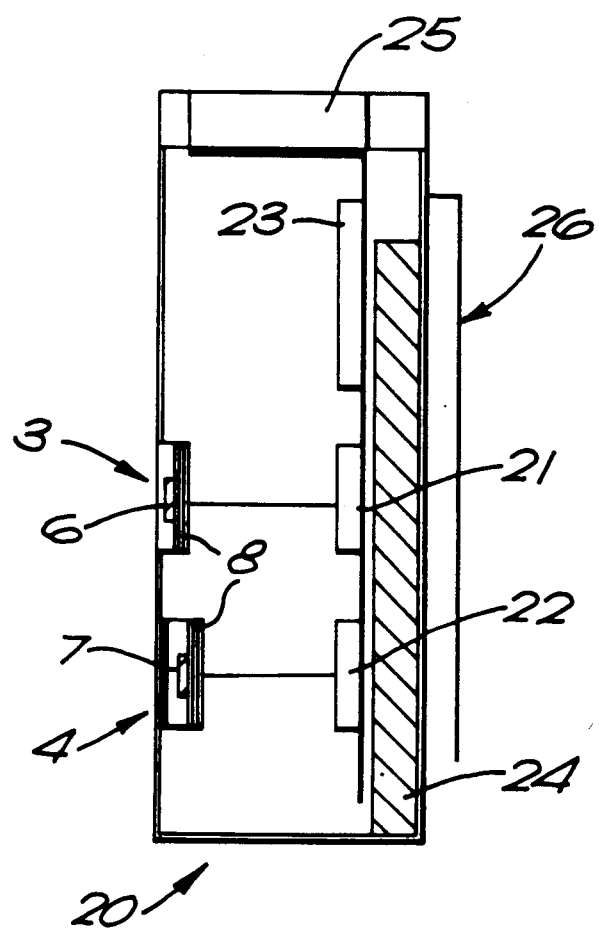
FIG. 2 shows one embodiment of a radiation meter implementing the two detectors of the present invention.

In a possible embodiment of an instrument for use as a radiation meter, such as shown in FIG. 2, the two detectors and the circuitry of FIG. 1 may be contained within a case 20. The case itself may be arranged to be a suitable absorber, such that a gap is provided in the case to accommodate the detector 1 which is covered only by the thin conducting layer 3, as shown.

The second detector 2 is positioned within the case such that the case forms part of the layer 4 protecting the diode. The diodes 6 and 7 on headers 8 may be type BPX65 with the glass window removed.

The amplifier, threshold detector and counter for the full response channel (i.e. the detector having only the conductive shield) are located inside the case as indicated schematically at 21. The amplifier, threshold detector and counter for the half response beta channel are also located inside the case at 22, and a microprocessor 23 is similarly supported inside the case. A battery 24 provides the reverse bias for the diodes within the radiation meter, and a liquid crystal display 25 indicates the measured beta radiation dose.

A clip 26 may be provided on the case for attachment of the meter to a coverall pocket, for example, for ease of carrying.

What we claim is:

1. A radiation meter comprising:
   first and second radiation detectors and a shield for each detector;
   the shield for the first detector being constituted by a thin layer of electrically conductive material shielding said first detector against electromagnetic interference;
   the shield for the said second detector shielding said second detector against electromagnetic interference and providing a predetermined partial attenuation of beta radiation;
   such that beta radiation dose rate can be measured in the presence of X and gamma radiation.

2. The meter of claim 1 wherein the shield for the second detector is constituted by a thin layer of electrically conductive material and a relatively thick layer of dielectric material.

3. The meter of claim 1 wherein the shield for the second detector is constituted by a relatively thick layer of low atomic number electrically conductive material.

4. The meter of claim 1 wherein the radiation detectors each comprise a reversed biased PIN diode.

5. The meter of claim 1 and including for each detector amplifying means and a pulse counter for developing a signal defining a respective dose rate.

6. The meter of claim 5 comprising means responsive to said signals to provide an output representing a difference in count rate of the two detectors.

7. A radiation meter comprising:
   first and second radiation detectors and a shield for each detector, the shield for the first detector being constituted by a thin layer of electrically conductive material, and the shield for the second detector being constituted by a thin layer of electrically conductive material and a relatively thick layer of dielectric material, such that beta radiation dose rate can be measured in the presence of X and gamma radiation, and including for each detector;
   amplifying means and a pulse counter for developing a signal defining a respective dose rate; and further comprising
   means responsive to said signals to provide an output representing a difference in count rate of the two detectors, said layer of dielectric material having a thickness such that the difference in count rate of the two detectors is substantially independent of whether the beta radiation has high or medium energy.

8. A radiation meter comprising:
   first and second radiation detectors and a shield for each detector, the shield for the first detector being constituted by a thin layer of electrically conductive material, and the shield for the second detector being constituted by a relatively thick layer of low atomic number electrically conductive material, such that beta radiation dose rate can be measured in the presence of X and gamma radiation, and including for each detector;
   amplifying means and a pulse counter for developing a signal defining a respective dose rate; and further comprising
   means responsive to said signals to provide an output representing a difference in count rate of the two detectors, said layer of low atomic number electrically conductive material having a thickness such that the difference in count rate of the two detectors is substantially independent of whether the beta radiation has high or medium energy.

9. A radiation meter comprising:
   a first detector having a first output;
   a first shield which shields said first detector from low energy electromagnetic interference and is substantially transparent to beta radiation of medium and high energies;

a second detector having a second output and a second shield which inhibits low energy electromagnetic interference and provides a selected partial attenuation of beta radiation;

first and second threshold detectors coupled to said first and second detectors respectively for inhibiting response of the outputs to radiation of low energy below a predetermined threshold; and means for comparing the first and second outputs.

10. The meter of claim 9 wherein said means for comparing comprises for the first detector a first amplifier, and a first counter, for the second detector a second amplifier, and a second counter, and a calculation unit to which said first and second counters are connected.

11. The meter of claim 10 comprising means for providing a resultant output from said calculation unit representing a difference in said first and second outputs.

12. A personal radiation dosimeter comprising:

a case for carrying on the human person;

first and second detectors within the case, each detector having a response to incident radiation and being coupled to circuit means for providing an output pulse signal at a rate corresponding to radiation which is incident on the respective detector and exceeds a predetermined threshold and means for comparing the pulse rates;

a first shield for the first detector, said first shield allowing substantially complete transmission of beta radiation;

a second shield for the second detector, said second shield attenuating beta radiation and allowing partial transmission thereof, the second shield having a predetermined thickness such that the responses of the two detectors are substantially similar for x and gamma radiation and the difference in the pulse rates is substantially independent of energy for beta radiation, so that beta radiation dose rate can be measured in the presence of x and/or gamma radiation.

13. A personal radiation dosimeter according to claim 12, wherein said second shield includes a relatively thin layer of electrically conductive material and a relatively thicker layer of low atomic number material.

14. A personal radiation dosimeter according to claim 12, wherein the second shield comprises a relatively thin layer of electrically conductive material and a relatively thicker layer of dielectric material.

15. A personal radiation dosimeter according to claim 12, wherein said first shield comprises a thin layer of electrically conductive material.

* * * * *

UNITED STATES PATENT AND TRADEMARK OFFICE
CERTIFICATE OF CORRECTION

PATENT NO. : 5,055,691

DATED : October 8, 1991

INVENTOR(S) : Peter H. Burgess

It is certified that error appears in the above-identified patent and that said Letters Patent is hereby corrected as shown below:

Column 1, line 36, after "attenuates" insert —beta—.
Column 2, line 8, delete "may" and insert —way—.
Column 2, line 29, after "layer" insert —3)—.
Column 2, line 32, after "example" insert —be—.
Column 3, line 14, delete "$r$" and insert —$\approx$—.
Column 3, line 51, after "response" insert —beta—.
Column 6, line 23, delete "thicker" and insert —thick—.

Signed and Sealed this

Twenty-third Day of February, 1993

*Attest:*

STEPHEN G. KUNIN

*Attesting Officer*      Acting Commissioner of Patents and Trademarks